(12) United States Patent
Vandewinckel et al.

(10) Patent No.: US 7,201,453 B2
(45) Date of Patent: Apr. 10, 2007

(54) MORTAR BUGGY WITH STAKE BED ASSEMBLY

(75) Inventors: Stephen C. Vandewinckel, Livonia, NY (US); Francis W. Wenzel, Fairport, NY (US)

(73) Assignee: Stone Construction Equipment, Inc., Honeoye, NY (US)

( * ) Notice: Subject to any disclaimer, the term of this patent is extended or adjusted under 35 U.S.C. 154(b) by 0 days.

(21) Appl. No.: 10/767,220

(22) Filed: Jan. 30, 2004

(65) Prior Publication Data
US 2005/0168004 A1 Aug. 4, 2005

(51) Int. Cl.
*B60P 7/06* (2006.01)
(52) U.S. Cl. ............ 298/1 C; 298/24; 298/23 S; 298/1 A; 296/181.7; 296/186.5; 296/10; 296/26.09; 296/26.13; 296/43
(58) Field of Classification Search ........... 298/1 A, 298/1 C, 2, 24, 22 R, 23 S, 17 T, 23 A; 296/43, 296/10, 36, 3, 51, 26.03, 26.08, 26.09, 26.12, 296/26.13, 181.7, 183.2, 186.5; 280/147, 280/401, 656, 47.18, 491.1
See application file for complete search history.

(56) References Cited
U.S. PATENT DOCUMENTS 4,216,988 A * 8/1980 Weiss
6,155,648 A 12/2000 Dombek et al. ............ 298/1 C
6,619,754 B1 9/2003 Dombek et al. ............ 298/1 C
6,644,708 B1 * 11/2003 Grzegorzewski et al.
6,848,526 B2 2/2005 Burt et al.
2001/0000641 A1 5/2001 Dombeck et al. ............ 298/7

OTHER PUBLICATIONS

"We've re-engineered the Power Buggy", Whiteman Industries, Inc., (date unknown).
"The Ultimate Power Buggy", Miller Spreader Company, (date unknown).

* cited by examiner

*Primary Examiner*—Stephen Gordon
(74) *Attorney, Agent, or Firm*—Jacobson Holman PLLC

(57) ABSTRACT

A mortar buggy with stake bed assembly provides a removable flat heavy duty base platform and a rear panel that can be fitted onto the chassis of an existing mortar buggy or similar conveyance in place of a hopper. The stake bed assembly provides removable front and side panels made of solid steel or similar alloy that can be configured to attach vertically in a hopper configuration or horizontally in an extended flat bed configuration, to provide additional loading surface for long or large items. The stake bed assembly also provides for a removable front tailgate with the ability to hinge at both its top and bottom so that the front tailgate can swing either up or down.

20 Claims, 8 Drawing Sheets

MORTAR BUGGY WITH STAKE BED ASSEMBLY

BACKGROUND OF THE INVENTION

1. Field of the Invention

The present invention generally relates to a powered material transporting vehicle generally known in the art as a mortar buggy for moving material, primarily mortar, concrete, gravel, dirt and other materials capable of being placed in a hopper or tub for transport to or around a job site and dumped by tilting the hopper or tub, which can be fitted with a stake bed assembly in place of the ordinary plastic or metal hopper of the mortar buggy to allow the powered, movable buggy to act as a stake bed carrying platform. The stake bed can then be configured in a variety of ways, including a flat bed or an extended flat bed, or a closed wall hopper. When assembled in the hopper configuration, a double-acting tailgate is hinged at the top or bottom.

2. Description of the Prior Art

Prior art mortar buggies are well-known light industrial vehicles designed to haul loads from a few hundred pounds to a few tons. The typical power buggy comprises 1) a chassis supported on the ground via a plurality of wheels, 2) a storage bucket or tub supported on the front end of the chassis and liftable to dump loads, and 3) a power source for propelling the vehicle and for operating other powered equipment on the vehicle. The typical power buggy is controlled by an operator who is stationed behind the power buggy and who either walks behind the power buggy or stands on an operator's platform mounted on the rear end of the chassis. Controls for the typical power buggy include a steering control mechanism, a speed control mechanism, an engine kill switch or similar controller, and dump controls which raise and lower the bucket. The vehicle is steered by a generally Y-shaped handlebar having a pair of handgrips. Vehicle propulsion is controlled by a squeeze lever mounted adjacent one of the handgrips.

Power buggies of this general type are commercially available from Miller, the Morrison Division of Amida Industries, Inc., the Whiteman Division of Amida Industries, Inc., Schroeder Industries and Stone Construction Equipment, Inc., the assignee of the instant application. In almost all instances, the prior art buggies are equipped with either metal or plastic hoppers of various sizes which are only useful for carrying soft or granular materials such as mortar, sand, gravel and the like. They are not useful for conveying large or heavy materials either because of the size constraint of the hopper (such as lumber or pipe), or because it would be too difficult to load and unload (such as bricks or blocks).

Recently, there has been a mortar buggy offered by Miller which can be converted to a stake bed configuration; however, it has many limitations. In the stake bed configuration, the side walls are open stake sides which are basically loose pieces of metal connected with posts and dropped into holes welded on the side of the bed. The Miller stake bed is not capable of carrying loose or granular materials nor can its stake sides be converted for an extended flat bed or platform.

What is needed is a mortar buggy which can readily be converted to a stake bed equipped with a more versatile style hopper, one that can be used for hauling bricks, wood, blocks and other commonly found building materials in addition to loose granular materials, such as dry cement and mortar, gravel and dirt.

SUMMARY OF THE INVENTION

The mortar buggy with stake bed assembly of the present invention includes a standard mortar buggy with a chassis, power source and front end plastic and/or metal hopper supported on and rigidly connected to a pivoting dump plate or hopper subbase. The hopper and subbase are easily removed and replaced by the stake bed assembly. The stake bed assembly includes a heavy duty flat bed or base platform with a connected solid rear panel, a pair of side panels which can be fitted vertically on the sides of the flat bed, and a front tailgate mounted on the front edges of the side panels at all four corners.

The front tailgate and two side panels are preferably reinforced flat panels so that, when assembled on the flat bed or base platform and rear panel, they form a closed wall hopper which can carry loose objects, such as gravel, cement and dirt, without falling out through openings in the walls. The front tailgate is preferably double hinged, at the top and at the bottom, so that the tailgate can fold down when using the bottom hinges and can open downwardly when hinged at the top for easily dumping materials carried in the hopper.

The side panels and front tailgate are removable to form a standard flat bed configuration. The side panels and the base platform are preferably configured to attach the side panels horizontally along each respective side edge of the base platform to create an extended flat bed configuration, which provides additional loading surface. When folded down, the front tailgate also extends horizontally to extend the usable flat bed surface.

Accordingly, it is an object of the present invention to provide a mortar buggy with a stake bed assembly which can be readily and easily converted from a standard mortar buggy with plastic or metal hopper or tub to a stake bed structure which can be converted between a hopper configuration, a flat bed, and an extended flat bed for transport of various construction materials which cannot be readily transported in a mortar buggy.

It is another object of the present invention to provide a stake bed assembly which can be readily adapted to fit in place of a hopper or tub on any standard mortar or power buggy.

A further object of the present invention is to provide a mortar buggy with a flat bed and rear panel that support two solid metal side panels which can be fitted into the flat bed and locked into position and a solid front tailgate to form a dumpable metal hopper on the front of the mortar buggy chassis.

Another object of the present invention is to provide the front tailgate of the stake bed of the preceding object with hinges at both its top and its bottom so that the front tailgate can swing down planar with the flat bed platform or open at its bottom when the hopper is moved to a dumping position so that granular materials can be spread or dumped, respectively, when the stake bed is moved to a dumping position.

A further object of the present invention is to provide an interlock system which holds the solid side panels firmly in place in both the vertical hopper configuration, or in the horizontal extended flat bed configuration.

Still another object of the present invention is to provide swing out supports which allow the side panels to bear extra weight while in the extended flatbed configuration, but then swing flat against the sides of the flat bed or base platform when not in use.

Another object of the present invention is to provide an assembly that allows all of the panels to be removed in order to allow the buggy to maneuver through doorways and other narrow spaces.

A still further object of the present invention is to provide a stake bed assembly wherein the removable side panels and front tailgate fit snugly together with the flat bed or base platform and rear panel to allow the stake bed to carry loose materials such as gravel, dry cement and dirt.

Yet another object of this invention to be specifically enumerated herein is to provide a mortar buggy in accordance with the preceding objects which will conform to conventional forms of manufacture, be of simple construction and easy to use so as to provide a structure that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTIONS OF THE DRAWINGS

DESCRIPTION OF THE PREFERRED EMBODIMENT

Figure 1:
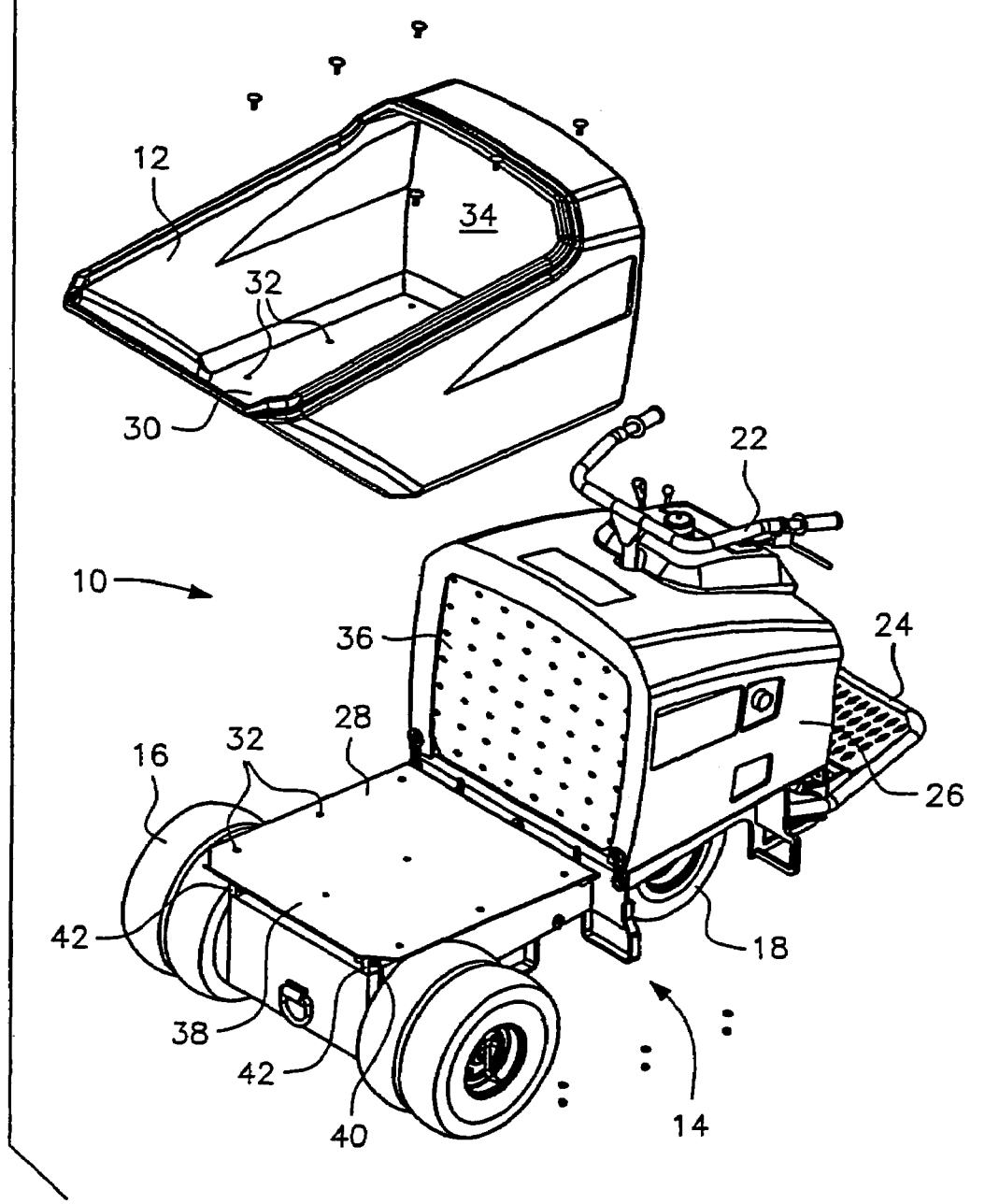
FIG. 1 is an exploded perspective view of a mortar buggy in accordance with the present invention utilizing a typical plastic hopper assembly.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose. It is also understood that the present invention is related to the mortar buggy invention by Applicants which is described in detail in U.S. patent application Ser. No. 10/231,458 filed Aug. 30, 2002 and which is incorporated herein by reference as if fully set forth in its entirety.

Turning to the drawings, FIG. 1 shows an exploded perspective view of a mortar buggy in accordance with the present invention, generally designated by reference numeral 10, utilizing a typical one piece plastic hopper or tub 12 mounted on the front thereof. The mortar buggy 10 includes a chassis, generally designated by reference numeral 14, supported and moved along the ground surface by front wheels 16 and rear wheels 18. The buggy 10 is powered by an engine and related motor and control components (not shown), which are covered by cowl 26 and splash guard panel 36. The buggy 10 is steered by handle bars 22 by an operator (not shown) standing on a rear platform 24, all in a conventional manner.

The plastic hopper or tub 12 is supported on and rigidified by a metal base plate 28, typically made of steel or the like. The bottom 30 of the hopper or tub 12 is bolted to the top side of the base plate 28 through aligned holes 32 in a known manner. The forward end 38 of reinforcing base plate 28 is raised slightly by lugs 42 and pivoted to the chassis 14 by pivots 40 on lugs 42. A hydraulic cylinder 54 (see FIGS. 2 and 7) is mounted on the front end of chassis 14 to pivot the back end of the reinforcing base plate 28 and hopper or tub 12 mounted thereon from a generally horizontal transport position to a forward dumping position.

The hopper 12 is usually molded of one piece of plastic (or constructed of steel or other metal components) and is capable of carrying sand, soil, cement and other building materials. The materials are ordinarily removed by means of raising the rear of the hopper with the hydraulic cylinder 54 and dumping the material at the location desired.

Figure 2:
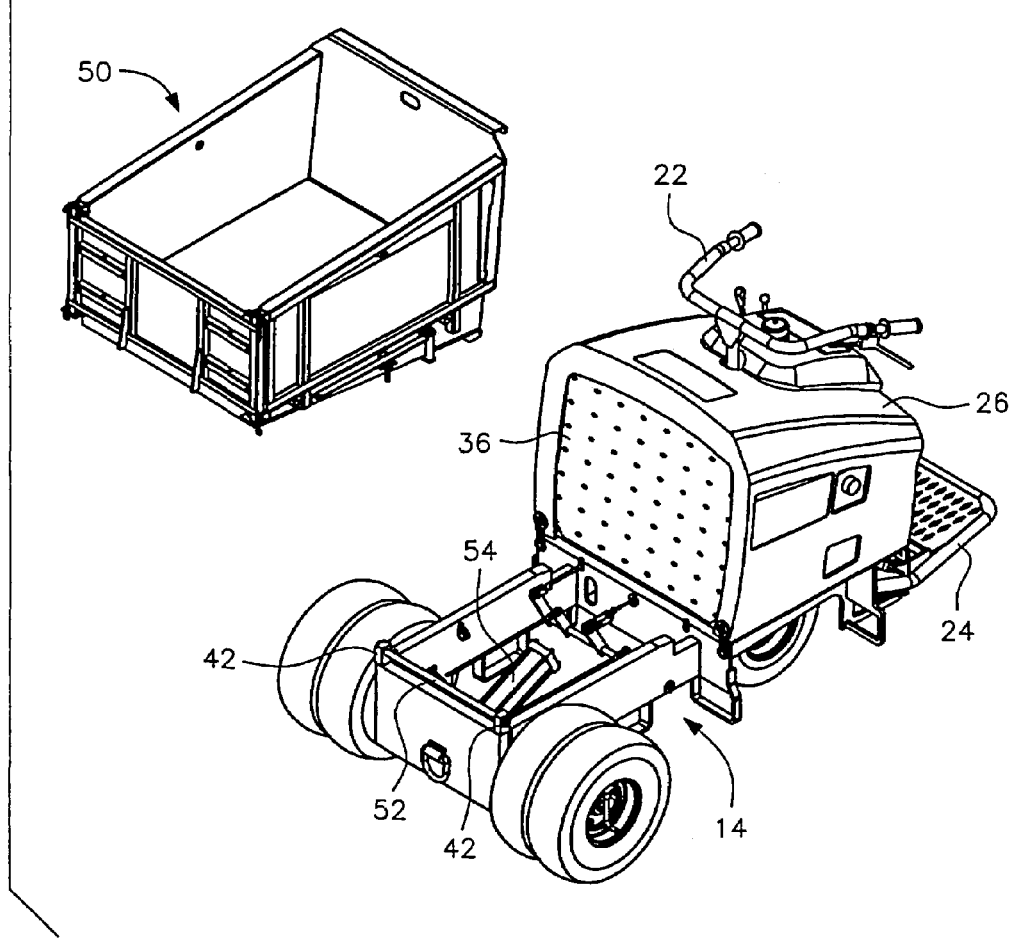
FIG. 2 is partially exploded perspective view showing a fully assembled stake bed assembly in accordance with the present invention and how it fits onto a mortar buggy chassis to replace the plastic hopper assembly.

FIG. 2 shows a fully assembled stake bed in accordance with the present invention, generally designated by reference numeral 50, positioned for pivotal mounting on the front end of the chassis 14, in replacement of the hopper or tub 12 and reinforcing base plate 28. The fully assembled stake bed 50 defines a hopper 51 therein. FIG. 2 also shows the pivot rod 52 about which the front end of base plate 28 with the hopper 12 thereon (in the FIG. 1 assembly) and the stake bed 50 (in the FIG. 2 assembly) can pivot, as well as the hydraulic cylinder 54, connected to the chassis 14 to raise and lower the rear end of the base plate 28 and hopper 12 assembly or the stake bed assembly 50.

The details of the stake bed assembly 50 are shown in FIGS. 3–6. The assembly 50 includes a stake bed base platform or flat bed, generally designated by reference numeral 56, rear panel 58 and two removable side panels 60 and 62. The flat bed 56 includes a generally flat rectangular platform 64 and a subframe structure 66. The subframe structure 66 reinforces the platform 64 and aligns the flat bed 50 for proper positioning on the buggy chassis 14 for the various stake bed configurations.

In the preferred embodiment, the rear panel 58 is actually part of the flat bed platform 64 and is made from one piece of solid steel or other similar metal or material with the rear panel 58 bent almost to 90°. The platform 64 is then welded or otherwise permanently attached to the subframe structure 66 which provides strength and rigidity to the platform 64. While it is contemplated in the preferred embodiment that the components of the stake bed assembly are all constructed from steel or similar metal, polymers with reinforcing carbon fibers or the like, or similar composite materials could also be used.

The side panels 60 and 62 are preferably flat panels made of steel or like material, which are reinforced by horizontal and vertical members 68 and 70, respectively. The reinforcing members 68 and 70 are preferably square steel tubing welded to the outside of the side panels 60 and 62. The vertical members 70 are known in the art as "stakes" which include stake extensions 72 extending beyond the lower edge of the side panels 60 and 62, preferably about three inches. When installed for the stake bed or hopper configuration, the side panels 60 and 62 are placed in a generally vertical position so that the stake extensions 72 fit securely into vertical aligned stakeholders 74 which are welded to the side of the subframe 66. The platform 64 has openings 76 above the vertical stakeholders 74 which allow the stakes 72 to fit through the platform 64 and into the vertical stakeholders 74.

The back edges of side panels 60 and 62 have connecting plates 78 welded thereon. The connecting plates 78 include rearwardly extending projections 80 which engage in slots 82 of the back panel 58 as the side panels 60 and 62 are moved downwardly to engage stake extensions 72 within stakeholders 76. The projections 80 are positioned such that the notch 84 defined therein engages the lower edge of corresponding slot 82 when the bottom edges of the side panels 60 and 62 engage the upper surface of the flat bed platform 64 and the stake extensions 72 are fully fitted within stakeholders 74. The stake extensions 72 fitted into the stakeholders 74, and the notches 84 fitted over the bottom of opening 82, thus hold the side panels 60 and 62 in their properly designed position, provide strength and rigidity to the platform 64, rear panel 58, and side wall panels 60 and 62 combination, and provide a solid wall structure for hopper 51 to retain gravel, dry cement, dirt and other loose materials within the hopper 51.

Figure 4:
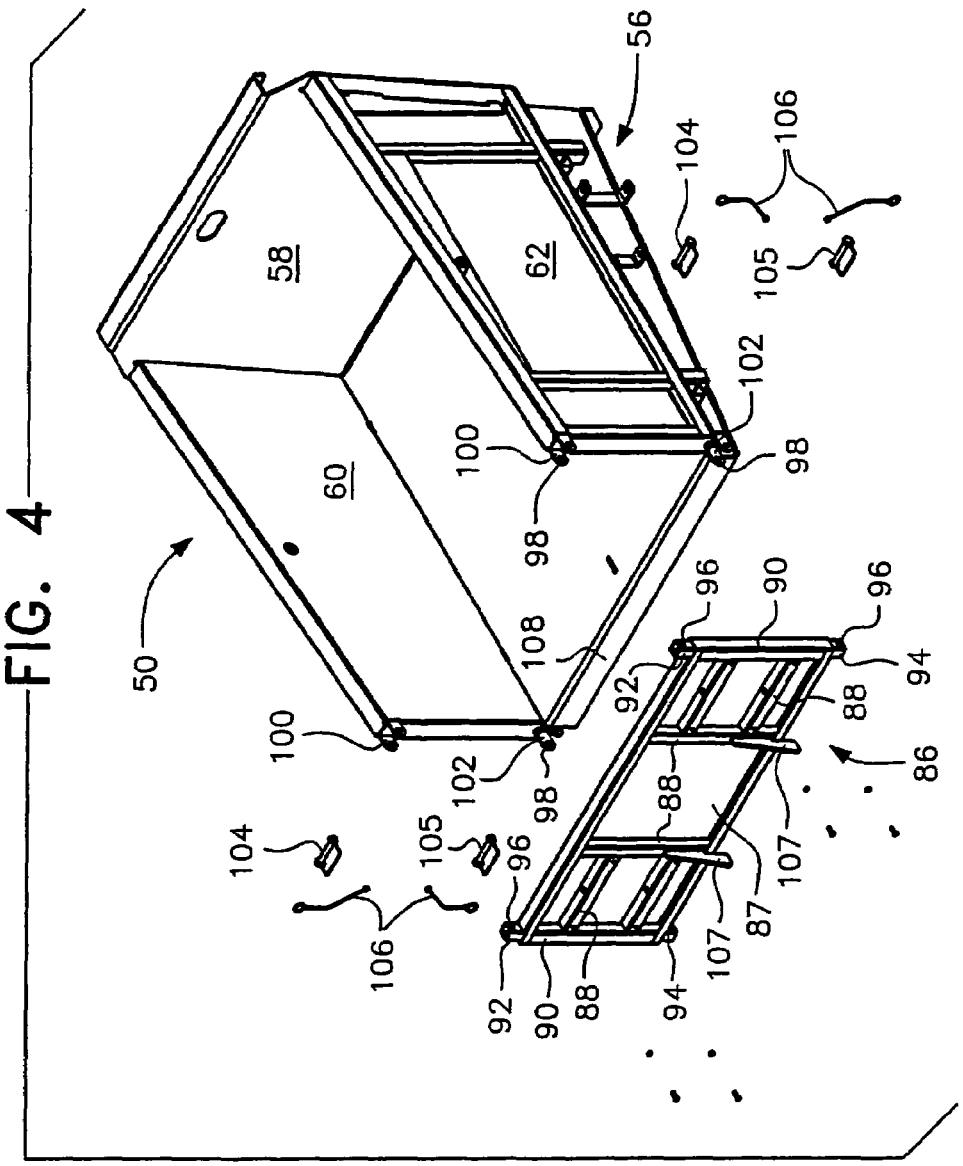
FIG. 4 is an exploded perspective view illustrating the stake bed assembly shown in FIG. 2, partially assembled, with the front tailgate and connection points.

Once the side panels 60 and 62 are fitted into the flat bed 56 and rear panel 58, the front tailgate 86 can be fitted onto the front edges of the side panels. FIG. 4 illustrates the preferred embodiment of a front tailgate, generally designated by reference numeral 86, in accordance with the present invention. The tailgate 86 includes a flat panel 87 and horizontal and vertical reinforcing square metal tubing 88 and 90 that is welded to the outside of panel 87 to provide strength and rigidity for the tailgate 86.

The outermost vertical square metal tubes 90 protrude above and below the top and bottom edges of the panel 87 in order to attach the front tailgate 86 to the forward edge of side panels 60 and 62. Projections 92 of outer vertical tubing 90 extends above panel 87 and projections 94 extend below. These projections 92 and 94 permit the front tailgate 86 to be attached to the front edge of the side panels 60 and 62 and the subframe flat bed 66 at all four corners of the tailgate 86 by the use of a hinge pin or similar connection.

The upper and lower projections 92 and 94, respectively, each includes a hole or opening 96 extending therethrough parallel to the panel 87. The holes 96 align with matching holes 98 on upper and lower tabs 100 and 102, respectively. The upper tabs 100 project forwardly from the top front edge of the side panels 60 and 62, and the lower tabs 102 project forwardly from the front edge 108 of the subframe 66. When the holes 96 and 98 are aligned, the projections 92 and 94 can be assembled on tabs 100 and 102 by utilizing hinge pins 104 and 105 or other similar connecting assemblies.

To install the front tailgate 86, the user will fit the panel 87 against the front edges of the side panels 60 and 62, with the projections 92 and 94 at each corner of the tailgate properly positioned relative to their respective tabs 100 and 102 at the top of the side panels 60 and 62 and front edge 108 of subframe 66. The user then aligns the holes 96 in the projections 92 and 94 with the holes 98 in the tabs 100 and 102, respectively, and inserts the hinge pins 104 and 105 therethrough. A leash or other securing device 106 holds the hinge pins 104 and 105 from falling free when not in use.

The assembly of the projections 92 and 94 of the front tailgate 86 into tabs 100 at the top front edge of panels 60 and 62 and into tabs 102 at the front edge 108 of subframe 66 serve to secure the front end of panels 60 and 62 into proper orientation with respect to the platform 64.

Figure 7:
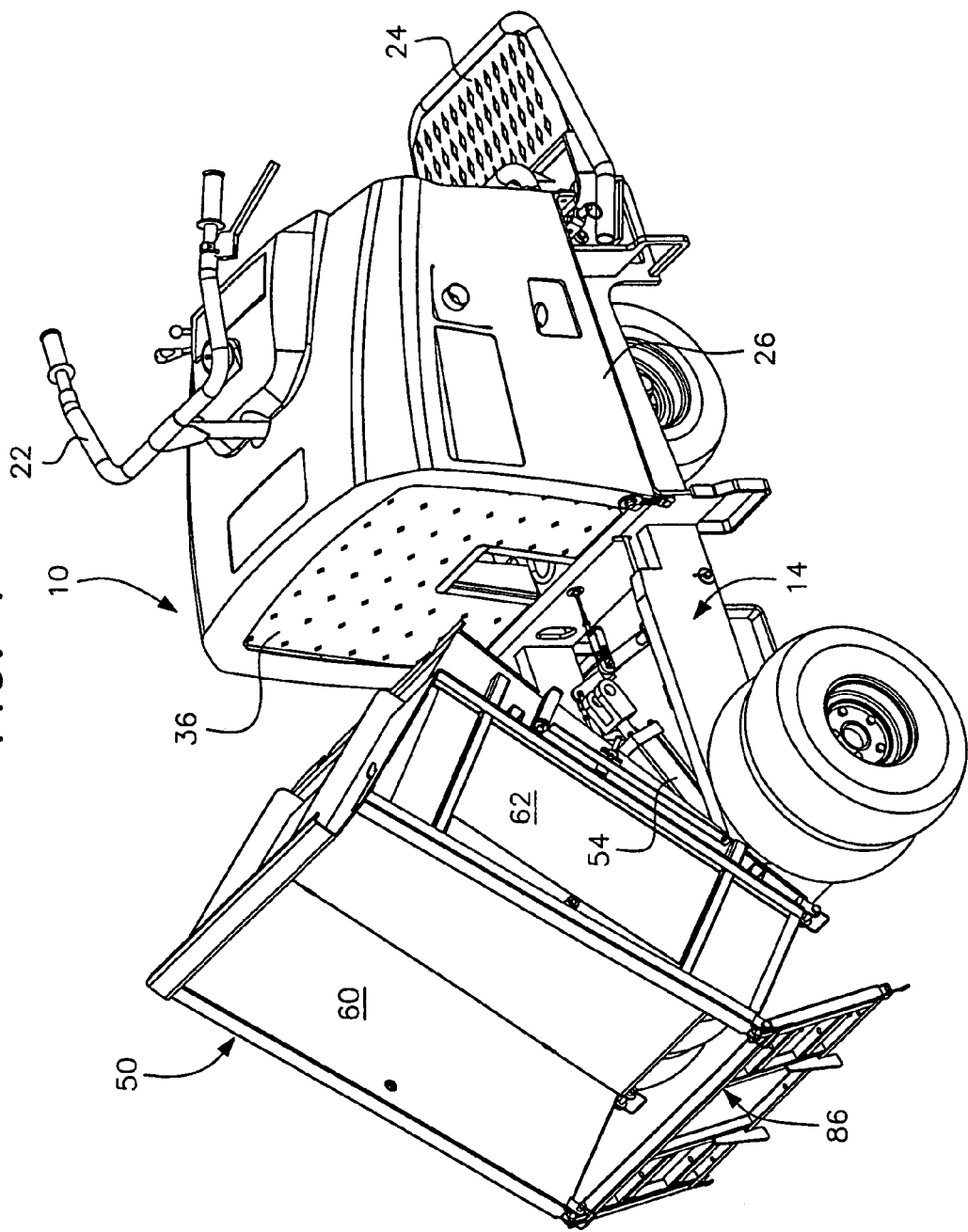
FIG. 7 is a perspective view of the mortar buggy converted to a stake bed assembly in the hopper configuration in accordance with the present invention, and with the hopper being in the dumping position.
Figure 8:
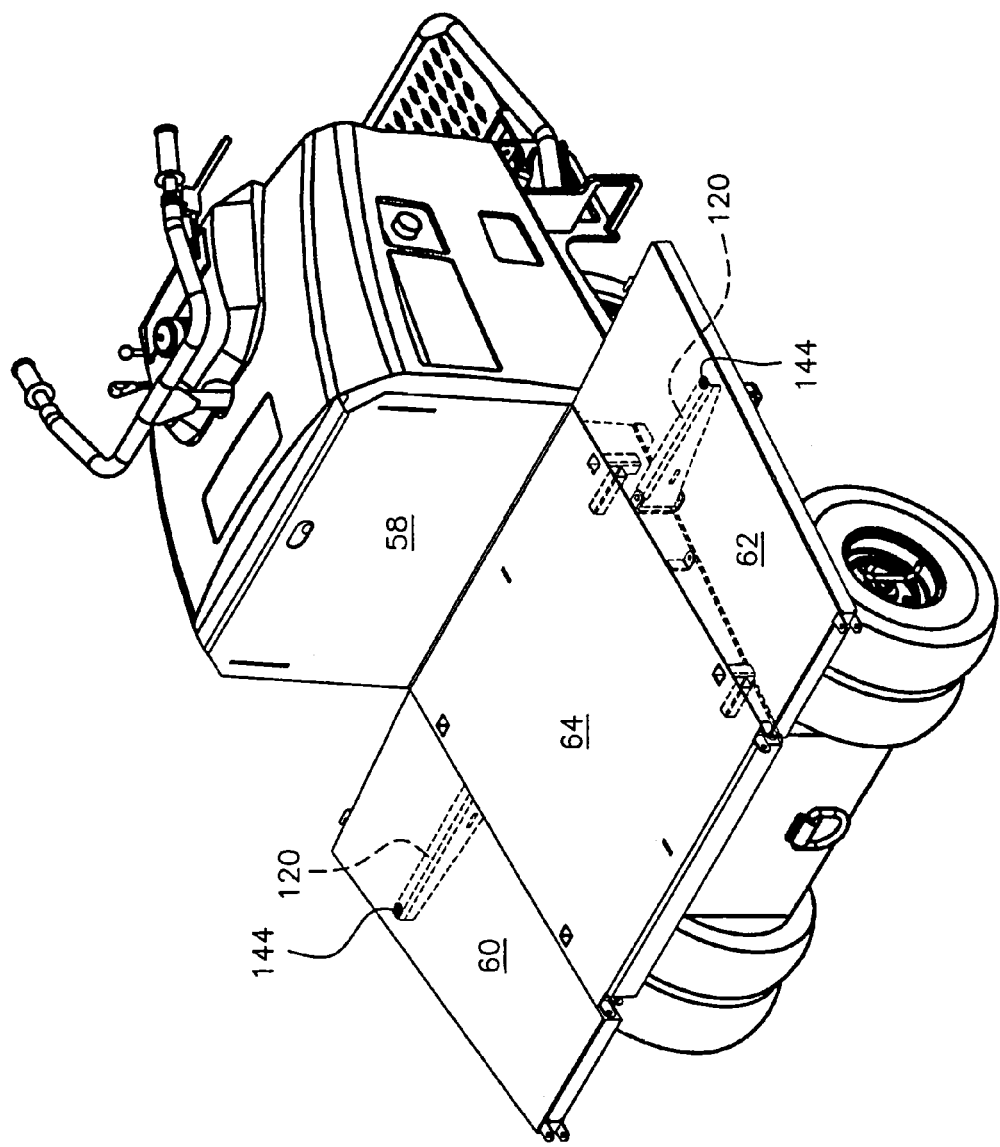
FIG. 8 is a perspective view of the mortar buggy converted to an extended flat bed configuration in accordance with the present invention.

The bottom of the tailgate 86 can be left unsecured from tabs 102, which allows the tailgate to pivot about hinge pins 104. This permits the stake bed assembly 50 to dump a load within hopper 51 in a traditional dumping action when the stake bed 50 is lifted by hydraulic cylinder 54 as shown in FIG. 7. The piston end of hydraulic cylinder 54 is shown not connected in FIG. 7.

Alternatively, the top of tailgate 86 can be left unsecured from tabs 100, which allows the tailgate to swing downwardly around pivots 105 and away from the platform 64 into a position generally parallel to the platform 64. See FIG. 6. Stops 107, preferably mounted on the front of the tailgate 86, engage the front edge 108 of subframe 66 to prevent the tailgate 86 from moving downwardly past the generally horizontal position. This downward position can be useful when spreading material when the hopper 51 is lifted by the hydraulic cylinder 54 and also expands the usable surface of the flat bed 56 when in an expanded flat bed configuration.

Figure 5:
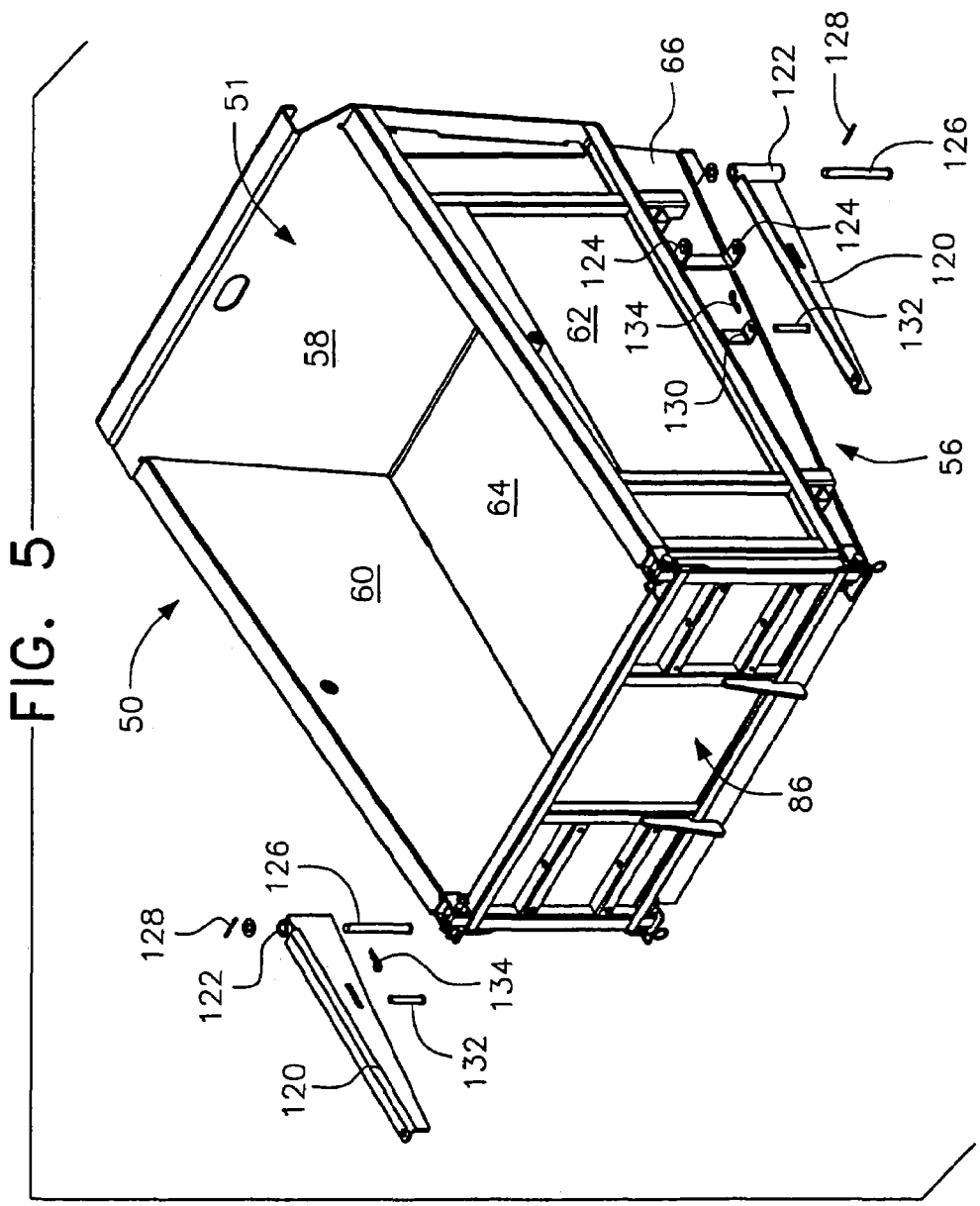
FIG. 5 is a perspective view of the stake bed assembly of the present invention with an exploded view of the swing out arms and fasteners.

FIG. 5 shows the stake bed 50 in the fully assembled hopper configuration with the hopper 51 defined by the platform 64, front tailgate 86 secured at both top and bottom, the side walls 60 and 62 and rear wall 58. Swing-out arms 120 are used in the extended flat bed configuration. In a preferred embodiment the swing-out arms 120 have a tubular member 122 welded to its hinge end which fits within a pair of hinge tabs 124. The tabs 124 have holes to allow a hinge pin 126 to fit through the hinge tabs 124 and through the tubular member 122 to support and hingedly attach the swing-out arms 122 to the subframe 66. The hinge pins 126 are held in place with a cotter pin or other fastener 128.

A second pair of securing tabs 130 with holes are also attached on both sides of the subframe 66, and located a short distance forward of the hinge tabs 124. When not in use, the swing-out arms 120 are held against the sides of subframe 66 by a clevis pin 132 which is fitted through the holes of the securing tabs 130 after the swing-out arms 120 have been positioned between the securing tabs 130. The clevis pins 132 are also held in place by cotter pins 134, to secure the clevis pins 132 from falling free. When in this hopper configuration, the side panels 60 and 62, front tailgate 86 and rear panel 58 fit snugly together so that hopper 51 can readily carry loose granular loads such as dirt, dry cement, sand, gravel, etc.

Figure 3:
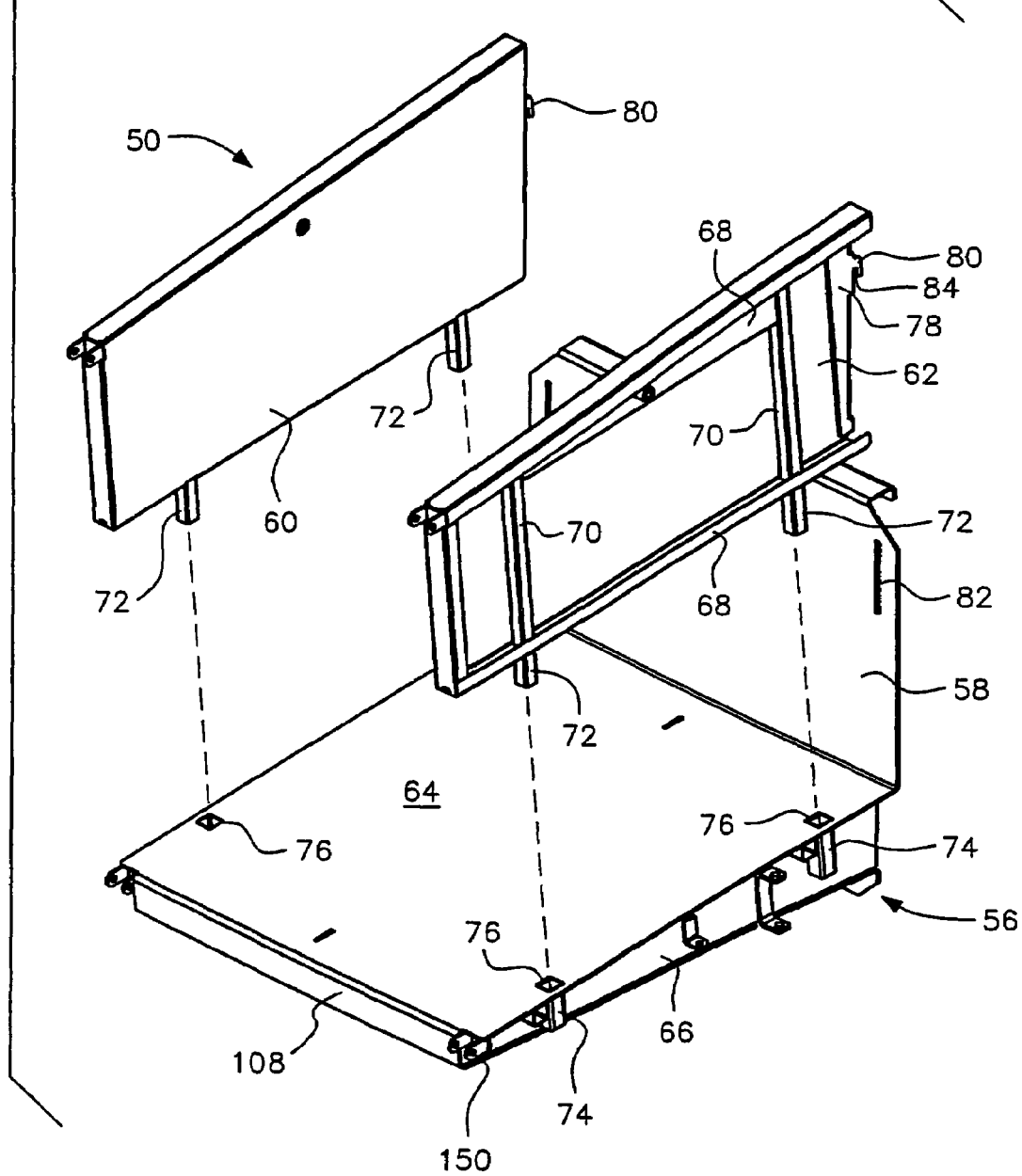
FIG. 3 is an exploded perspective view showing the flat bed or base platform with connected rear panel and removable side panels of the stake bed assembly shown in FIG. 2.
Figure 6:
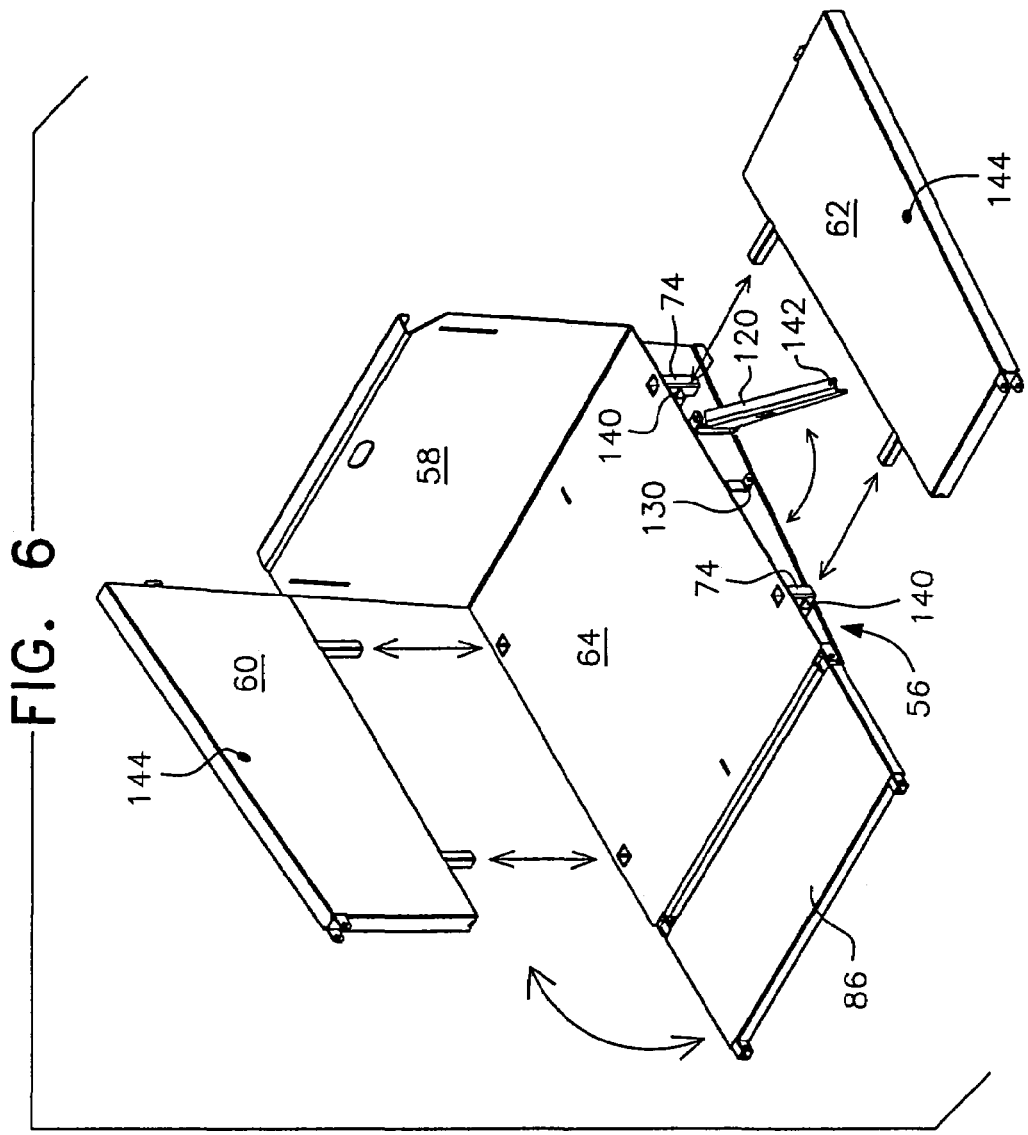
FIG. 6 is an exploded view of the stake bed assembly of the present invention showing how the stake bed assembly converts from a hopper configuration to an extended flat bed configuration.

Referring now to FIGS. 3 and 6, with the side panels 60 and 62 removed, FIG. 3 shows the stake bed assembly 50 in a normal flat bed configuration, without side panels or front tailgate. FIG. 6 shows the stake bed assembly 50 partially assembled in the extended flat bed configuration. For each side panel 60 and 62, the clevis pin 132 is removed from the securing tabs 130 and the swing-out arm 120 is released and positioned at a right angle to the subframe 66. The side panels 60 and 62 are lifted vertically to remove the panels from the vertical stakeholders 74 and slots 82 and away from the top of the platform 64. The side panels 60 and 62 are then oriented horizontally and the stake projections 72 of each side panel are fitted into a pair of horizontal stakeholders 140 which are positioned, preferably by welding, adjacent to and at right angles to the vertical stakeholders 74 on the subframe 66.

When the stake projections 72 of the side panels 60 and 62 are fitted into the horizontal stakeholders 140, the side panels 60 and 62 are held in a generally horizontal position planar to platform 64 and rest upon their respective swing-out arms 120. The swing-out arms 120 and the side panels 60 and 62 are aligned so that a securing hole 142 at the distal end of the swing-out arms 120 is positioned in alignment with a securing hole 144 at the outer edge of the side panels 60 and 62. The clevis pins 132 that were removed to allow the swing-out arms 120 to be released from alongside subframe 66, are then placed into the securing holes 144 of the side panels 60 and 62 and through securing holes 142 at the end of swing-out arms 120 to hold the swing-out arms and the side panels 10 in position during use of the stake bed assembly 50 in the extended flat bed configuration.

When the assembly 50 is converted to a flat bed configuration or an extended flat bed configuration, the mortar buggy can be used to move heavy loads that would be difficult or impossible to place inside a hopper. For example, any construction materials of large length, such as lumber, pipe, tubing, and rebar, can be bundled and loaded onto the extended flat bed configuration easily. In addition, other materials that are heavy but would be awkward to load or unload from a deep hopper are also easily carried by the present invention. For example, materials such as bricks, blocks, nails, and other heavy objects that cannot be dumped or where the user would have to bend over the edge of the hopper to load and unload causing back strain are easily handled with the stake bed assembly.

The stake bed assembly 50 of the present invention is designed to be easily adapted to most mortar buggy chassis with ordinary fastening hardware. In the preferred embodiment of the present invention, the base plate 28 and bolted on plastic hopper 12 assembly are easily removed from the chassis 14 by pulling out the pivot rod 52 and the pivot connection between the piston rod end and a bracket or other connection on the underneath side of plate 28 (not shown). The plate and hopper assembly can then be lifted off from chassis 14 and replaced by the stake bed assembly 50.

The pivot rod 52 is then reinserted in pivot openings 150 on both sides of the forward end of subframe 66 and the distal end of the piston rod is reconnected to a bracket or other connection on the underneath side of platform 64. The same or similar connections are already present or can be installed on most mortar buggy chassis in order to accommodate the stake bed assembly 50 of the present invention.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A stake bed assembly for a mortar buggy comprising:
   a) a removable flat bed with an attached rear end wall and a subframe which allows the flat bed to be supported from a chassis of a mortar buggy from which a mortar hopper has been removed, said flat bed having a plurality of vertical and horizontal stakeholders along side edges thereof which can receive stake members;
   b) left and right removable side panels each having at least two stake members attached to said panels which extend beyond one edge of each said panels for selective insertion into said vertical stakeholders to form a hopper or into said horizontal stakeholders to form an extended flat bed;
   c) a front tailgate attachable to a front edge of said side panels and flat bed when said stake members on said side panels are set into the vertical stakeholders; and
   d) a pair of left and right extendable arms supported from said removable flat bed to support said left and right side panels when said stake members of said side panels are inserted into said horizontal stakeholders to form said extended flat bed.

2. The stake bed assembly for a mortar buggy of claim 1 wherein said front tailgate is pivotally supported such that it can be hinged to swing away from the side panels at its top or bottom.

3. The stake bed assembly for a mortar buggy of claim 1 wherein said left and right panels have a securing hole and said arms have a securing hole to secure each arm in position underneath its respective panel.

4. The stake bed assembly of claim 1 wherein the side panels, rear end wall and front tailgate, fit snugly together to form a solid wall hopper capable of carrying loose or granular materials.

5. The stake bed assembly for a mortar buggy of claim 1 wherein said front tailgate is attachable to the side panels and subframe of the flat bed when both side panels are set into the vertical stakeholders in a vertical orientation such that the front tailgate can be hinged to swing away from the side panels and subframe either from the top or the bottom of said tailgate.

6. The stake bed assembly for a mortar buggy of claim 1 wherein said front tailgate is attachable to the subframe of the flat bed when both side panels are set in a horizontal orientation to form extensions on said flat bed.

7. The stake bed assembly for a mortar buggy of claim 1 wherein said front tailgate can be attached to the subframe of the flat bed when the side panels are removed.

8. The stake bed assembly for a mortar buggy of claim 1 wherein said front tailgate is made of solid steel or other alloy and has stakes that are welded thereto to provide strength and rigidity.

9. The stake bed assembly for a mortar buggy of claim 1 wherein said front tailgate is attached to the side panels and the subframe of the flat bed at four corners through the use of a hinge pin system.

10. The stake bed assembly for a mortar buggy of claim 1 wherein said stake bed assembly is configured for pivoted attachment to a wheeled chassis.

11. The stake bed assembly for a mortar buggy of claim 1, wherein said side panels have a securing component and said arms swing out and have a cooperating securing component to secure each swing-out arm in position underneath its respective side panel.

12. The stake bed assembly for a mortar buggy of claim 1, further comprising projections on a back edge of said removable side panels which cooperate with generally vertical slots in said rear wall to secure said side panels to said rear wall when said stake members on said side panels are received in said vertical stakeholders.

13. The stake bed assembly for a mortar buggy of claim 1, wherein said tailgate when folded down generally planar to said removable flat bed expands said extended flat bed when said side panel stake members are inserted in said horizontal stakeholders.

14. The stake bed assembly for a mortar buggy as claimed in claim 1, wherein side edges of said flat bed and bottom edges of said side panels include said vertical and horizontal stakeholders defining connecting structure to support said side panels selectively in vertical and horizontal laterally extending positions in relation to said flat bed.

15. The stake bed assembly for a mortar buggy as claimed in claim 14, wherein said side panels in said horizontal position increase an effective width of a supporting surface formed by said flat bed.

16. A stake bed assembly for a mortar buggy comprising:
a) a removable flat bed with a rear end wall supported from a chassis of a mortar buggy from which a mortar hopper has been removed, said flat bed having vertical and horizontal stakeholders along side edges thereof which can receive stake members;
b) left and right removable side panels each having at least two stake members attached thereto which extend beyond one edge of each said panels for insertion into said vertical stakeholders to form a hopper or into said horizontal stakeholders to form an extended flat bed;
c) a front tailgate attachable to said side panels and flat bed when said stake members on said side panels are set into the vertical stakeholders; and
d) extendable arms supported from said removable flat bed to support said left and right side panels when said stake members on said side panels are inserted into said horizontal stakeholders to form said extended flat bed.

17. The stake bed assembly for a mortar buggy of claim 16 wherein said front tailgate is pivotally supported such that it can be hinged to swing away from the side panels at its top or bottom.

18. The stake bed assembly for a mortar buggy of claim 16 wherein said side panels have a securing component and said arms swing out and have a cooperating securing component to secure each swing-out arm in position underneath its respective side panel.

19. The stake bed assembly for a mortar buggy of claim 16, further comprising projections on a back edge of said removable side panels which cooperate with generally vertical slots in said rear wall to secure said side panels to said rear wall when said stake members on said side panels are received in said vertical stakeholders.

20. The stake bed assembly for a mortar buggy of claim 16, wherein said tailgate when folded down generally planar to said removable flat bed expands said extended flat bed when said side panel stake members are inserted in said horizontal stakeholders.

* * * * *